US010413080B2

(12) United States Patent
Bretis

(10) Patent No.: US 10,413,080 B2
(45) Date of Patent: Sep. 17, 2019

(54) SPRING ELEMENT, SPRING AND MATTRESS

(71) Applicant: Wilhelm Bretis, St. Andra (AT)

(72) Inventor: Wilhelm Bretis, St. Andra (AT)

( * ) Notice: Subject to any disclaimer, the term of this patent is extended or adjusted under 35 U.S.C. 154(b) by 0 days.

(21) Appl. No.: 16/089,356

(22) PCT Filed: Oct. 20, 2017

(86) PCT No.: PCT/EP2017/076833
§ 371 (c)(1),
(2) Date: Sep. 27, 2018

(87) PCT Pub. No.: WO2018/077741
PCT Pub. Date: May 3, 2018

(65) Prior Publication Data
US 2019/0110606 A1    Apr. 18, 2019

(30) Foreign Application Priority Data
Oct. 25, 2016    (AT) .............................. A 50979/2016

(51) Int. Cl.
*A47C 27/07* (2006.01)
*F16F 1/02* (2006.01)
(Continued)

(52) U.S. Cl.
CPC .............. *A47C 27/07* (2013.01); *A47C 27/05* (2013.01); *A47C 27/065* (2013.01); *A47C 27/20* (2013.01);
(Continued)

(58) Field of Classification Search
CPC ....... A47C 3/0252; A47C 3/021; A47C 27/07; A47C 27/05; A47C 27/065; A47C 27/20;
(Continued)

(56) References Cited

U.S. PATENT DOCUMENTS

| 5,280,890 A * | 1/1994 | Wydra .................... F16F 1/373 267/136 |
| 6,427,990 B1 * | 8/2002 | Hartmann ............ A47C 23/002 267/103 |
| 6,477,727 B1 * | 11/2002 | Fromme .............. A47C 23/002 267/81 |

FOREIGN PATENT DOCUMENTS

| DE | 202 02 050 U1 | 6/2002 |
| DE | 202015102183 U1 * | 6/2015 .............. F16F 1/025 |

(Continued)

OTHER PUBLICATIONS

DE 202015102183 English Translation (Year: 2015).*

*Primary Examiner* — Nicholas F Polito
*Assistant Examiner* — Amanda L Bailey
(74) *Attorney, Agent, or Firm* — TIPS Group

(57) ABSTRACT

A spring element (1) having a pair of sleeves formed of two sleeves (5, 7) is disclosed. Each sleeve (5, 7) of the pair of sleeves is formed of a closed band. The two oppositely disposed sleeves (5, 7) are connected to each other by a connecting piece (9) at one point of their circumference, respectively. On each sleeve (5, 7), a projection (11a, 11b) directed towards the opposite sleeve (7, 5) is provided, spaced apart from the connecting piece (9). In this way, a receiving space (13) defined by the connecting piece (9) and the projections (11a, 11b) is formed between the sleeves (5, 7). A spring comprises a rod-shaped central bar (21) and such a spring element (1). The spring element (1) is slid onto the central bar (21) such that a portion of the central bar (21) is held in the receiving space (13) of the spring element (1) and can be removed without damage from the receiving space (13) of the spring element (1). This spring is provided for a mattress for lying and/or seating means comprising a mattress body made of a material movable in itself, particularly foam or latex, having hollow spaces arranged trans- (Continued)

versely to a longitudinal axis or a lateral axis. A spring is provided in at least one hollow space.

14 Claims, 9 Drawing Sheets

(51) Int. Cl.
*F16F 1/26* (2006.01)
*F16F 1/18* (2006.01)
*A47C 27/20* (2006.01)
*A47C 27/05* (2006.01)
*A47C 27/06* (2006.01)

(52) U.S. Cl.
CPC .............. *F16F 1/025* (2013.01); *F16F 1/027* (2013.01); *F16F 1/185* (2013.01); *F16F 1/26* (2013.01)

(58) Field of Classification Search
CPC ...... F16F 1/00; F16F 1/18; F16F 1/182; F16F 1/185; F16F 1/26; F16F 3/087; F16F 1/025; F16F 1/027; F16F 3/023
USPC ........ 297/268.1, 264.1, 259.4; 267/158, 160, 267/180
See application file for complete search history.

(56) References Cited

FOREIGN PATENT DOCUMENTS

| | | |
|---|---|---|
| EP | 1 602 303 A2 | 12/2005 |
| EP | 2 116 152 A2 | 11/2009 |
| EP | 2 289 372 A1 | 3/2011 |
| EP | 2 526 834 A1 | 11/2012 |
| EP | 2 679 118 A1 | 1/2014 |
| ES | 2 171 339 A1 | 9/2002 |
| WO | 2009/133086 A2 | 11/2009 |

\* cited by examiner

SPRING ELEMENT, SPRING AND MATTRESS

The invention relates to a spring element according to the preamble of claim 1, a spring having such a spring element, and a mattress for lying and seating means having such a spring as well as to a method for producing a mattress.

Document EP 2 116 152 B1 discloses a mattress body made of foam or latex. Hollow spaces into which rod-shaped springs are inserted are provided in the mattress body. The springs are formed of a plastic material and consist of a central bar and spring elements formed therewith. Substantially, the spring elements have the form of a flattened ellipsis.

Due to the size of the spring, whose length approximately corresponds to the width of a mattress, comparatively large and, therefore, expensive molds are required for the plastic used as material. An adjustment of the springs to individual user requirements regarding a harder or softer suspension is only possible when using a suitably adapted mold by which, then, comparatively harder or softer springs can be produced. When one individual spring element breaks, this may only be replaced by exchanging the spring as a whole.

Thus, there is a need for a spring element and a spring especially for a mattress of a lying or seating means granting a user increased flexibility, particularly regarding the possibility of adjusting the softness or hardness of the mattress.

A spring element according to the invention comprises a pair of sleeves formed of two sleeves. Each sleeve of the pair of sleeves is formed of a closed band. The two oppositely disposed sleeves are connected to each other by a connecting piece at one point of their circumference, respectively. A projection directed towards the opposite sleeve is provided on each sleeve, spaced apart from the connecting piece. In this way, a receiving space defined by the connecting piece and the projections is formed between the sleeves.

The provision of individual spring elements allows the use of considerably smaller molds than those used for the above-described spring according to the prior art (EP 2 116 152 B1). Springs having a freely adjustable hardness can be created by sliding the spring elements onto a central bar, the latter being received in the receiving space. The hardness may be adapted by varying the distances of adjacent spring elements.

In such a spring element, each sleeve may advantageously have an approximately elliptic cross-section, which is flattened in the area of the connecting piece. Moreover, each projection can be wedge-shaped. In this way, the receiving space has an approximately rectangular cross-section.

The approximately elliptic cross-section has proved to be advantageous concerning strength and elasticity. The wedge-shaped formation of the projections makes it possible, during the sliding of the spring element onto a central bar, to uniformly open the receiving space by forcing the two projections apart. This serves to exclude an excessively wide opening of the receiving space, which might lead to damage or even destruction of the spring element. There is a distance between the two projections directed to the opposite sleeve, respectively. In this way, the spring element can be slid onto the central bar.

According to the invention, a spring has a rod-shaped central bar and a spring element as described above. The spring element is slid onto the central bar such that a portion of the central bar is held in the receiving space of the spring element and is removable from the receiving space of the spring element without damage.

As the central bar can be removed again from the receiving space without causing a damage to the central bar or the spring element, the spring element can be freely mounted on the central bar. In this way, the softness or hardness of a mattress in which the spring is installed can be advantageously adjusted. Besides, even after delivery of the mattress, the softness or hardness of the mattress can be adjusted by the user (customer) himself/herself. To do so, they only have to remove the spring from the mattress and have to remove, add or replug one or more spring elements from/to the central bar.

It shall further be pointed out that, for practical reasons, the spring element is usually slid onto the central bar or is removed therefrom while the central bar is fixed in a suitable clamping device. That is, the central bar is usually provided with a plurality of spring elements. Basically, however, also an insertion or removal of the central bar into/from the receiving space of a fixed spring element is possible.

Advantageously, the receiving space can be widened in the area of the projections by the two sleeves being compressed at a portion of the spring element which faces away from the receiving space. This allows the spring element to be slid onto the central bar or to be detached therefrom.

Thus, this sliding-on/removing of the spring element onto/from the central bar or this inserting/removing of the central bar into/from the receiving space of the spring element can be performed in a manner gentle to the material without running any risk of causing damage that may lead to material failure due to the material of the spring element or of the central bar being excessively strained.

Advantageously, the rod-shaped central bar can have a rectangular cross-section.

Due to the rectangular cross-sectional shape, a constant physical effort is required for inserting the central bar into the receiving space, which facilitates the production of a spring.

In addition, the rod-shaped central bar can comprise rung-like projections arranged along its longitudinal axis and equally spaced apart from each other. Said rung-like projections can be formed preferably in pairs. In a particularly advantageous manner, a distance between the rung-like projections can correspond to a width of the band forming the sleeves.

The rung-like projections can get into contact with the spring element slid onto the central bar, so that there is no lateral displacement of the spring element along the central bar (along the central axis of the central bar). Therefore, this embodiment serves to prevent that one or several spring elements are displaced during the installation of the spring into the mattress or during the use, which would affect the adjusted softness or hardness of the mattress.

Advantageously, the rung-like projections are formed in pairs. Moreover, there can be a distance corresponding to the width of the band forming the sleeves between adjacent pairs of the rung-like projections. In addition, there can be a pairs clearance between (=distance between each pair of) the individual rung-like projections.

This embodiment makes it possible to clearly position the spring element by form fit without risking a displacement of the spring element. Due to the pairs clearance, a minimum distance is always ensured between adjacent spring elements in the form of the pairs clearance and the width of the two rungs. This is to ensure that, when the spring is bent e.g. by a user lying or sitting on the mattress, adjacent spring elements do not cause damage due to clashing or rubbing against each other.

Advantageously, a rung-like projection or a pair of rung-like projections can be provided at each end of the rod-shaped central bar such that a stepless end surface is formed on both sides of the rod-shaped central bar.

Moreover, advantageously, the rod-shaped central bar can be connected at one of its ends to a second rod-shaped central bar by a connecting member.

Accordingly, it is possible to manufacture central bars in a specific length and to connect two central bars, if required. In this way, springs of any length can be produced.

Advantageously, the connecting member can comprise two jaw-like members which, by being compressed at one end, can be widened at the opposite end for receiving and removing the central bars.

In a way similar to the case of the receiving space, this embodiment makes it possible, in a manner gentle to the material, to mount the connecting member to the central bars to be connected.

Advantageously, the connecting member can comprise two opposing walls provided with a slit, between which, in a connected state, the rung-like projections are received at the stepless end surface of the two central bars. In this embodiment, one of the rod-shaped central bars is received in one of the slits, respectively.

In a likewise advantageous manner, a thickness of the opposing walls can correspond to the pairs clearance between the individual rungs of the pair of rung-like projections at the end of the rod-shaped central bar. In the connected state, each wall of the connecting member is disposed between the individual rungs of the pair of rung-like projections.

In this embodiment, the central bars are received into the slits of the walls of the connecting member by form fit. Namely, each wall of the connecting member abuts, on each side, on a rung-like projection of a pair of rung-like projections, respectively, while the central bar disposed in the slit abuts, on each side, on the wall of the connecting member. It is therefore not required to adjust the lengths or the shape of the ends of the central bars exactly enough for them to precisely abut on each other to establish the connection. Therefore, it is possible to simply cut the central bars to size within the course of a production without an exact dimensional accuracy being required.

Advantageously, at least one projection can be provided at an open end of each slit for limiting the slit in the shape of the cross-section of the central bar.

In this way, an unintended removal of the connecting member is prevented.

Several pairs of sleeves can be provided in a spring according to the invention, said pairs being slid onto the central bar such that the central bar is received in the receiving spaces of the pairs of sleeves, so that the pairs of sleeves are arranged parallel to each other along the central bar.

It is, however, not required that each gap between two adjacent rung-like projections (hereinafter: gap) is equipped with a spring element, which would result in a spring of maximum hardness. In an advantageous manner, the spring elements can e.g. be arranged in every second gap, in every third gap, etc., allowing the production of increasingly soft mattresses. It is, however, particularly advantageous to form the springs in the peripheral area of the mattress such that e.g. spring elements are provided in the first three to five directly adjacent gaps of the central bar whereas, in the central area, only every second, third, etc. gap is provided with a spring element. Thus, the spring according to the invention makes it possible to adjust the softness or hardness of the mattress by varying the distances between adjacent spring elements.

A mattress according to the invention for lying and/or seating means comprises a mattress body made of a material movable in itself, particularly foam or latex, having hollow spaces arranged transversely to a longitudinal axis or a lateral axis. In this mattress, a spring as described above is provided in at least one hollow space.

Such a mattress is particularly suited for beds, bunks, sofas, sofa beds, as seat surface or back rest for vehicle seats such as car seats, truck seats, seats for rail vehicles, aircraft seats, etc. This enumeration shall only be understood to be exemplary, not conclusive. Namely, due to the individual design of the spring elements, springs of any size and strength can be easily produced for the most different kinds of mattresses, also in the form of seat surfaces or back rests for various seats.

A method according to the invention for producing a mattress for lying and/or seating means, comprising a mattress body made of a material movable in itself, particularly made of foam or latex, having hollow spaces arranged transversely to a longitudinal axis or a lateral axis, comprises the steps of: producing a spring by sliding spring elements onto a central bar; fitting a funnel, whose cross-sectional shape corresponds to the contour of the spring, to a hollow space; and inserting the spring into the hollow space by applying pressure or by a tensile member conducted through the hollow space and connected to the central bar, wherein a connecting member is provided for connecting the central bar to the tensile member, said connecting member having two jaw-like members which are connected to each other and which, by being compressed at one end, can be widened at the opposite end for receiving and removing the central bar.

While the above-described elements (particularly the spring elements, the central bars, the connecting members) are preferably made of plastic, it shall be noted that basically also other materials, such as metal (spring steel) or wood (plywood) can be used to produce springs according to the invention or individual elements thereof.

A currently preferred embodiment of the invention will be described on the basis of the attached Figures, in which FIG. 1 is a perspective view of a spring element according to the invention;

Figure 1:
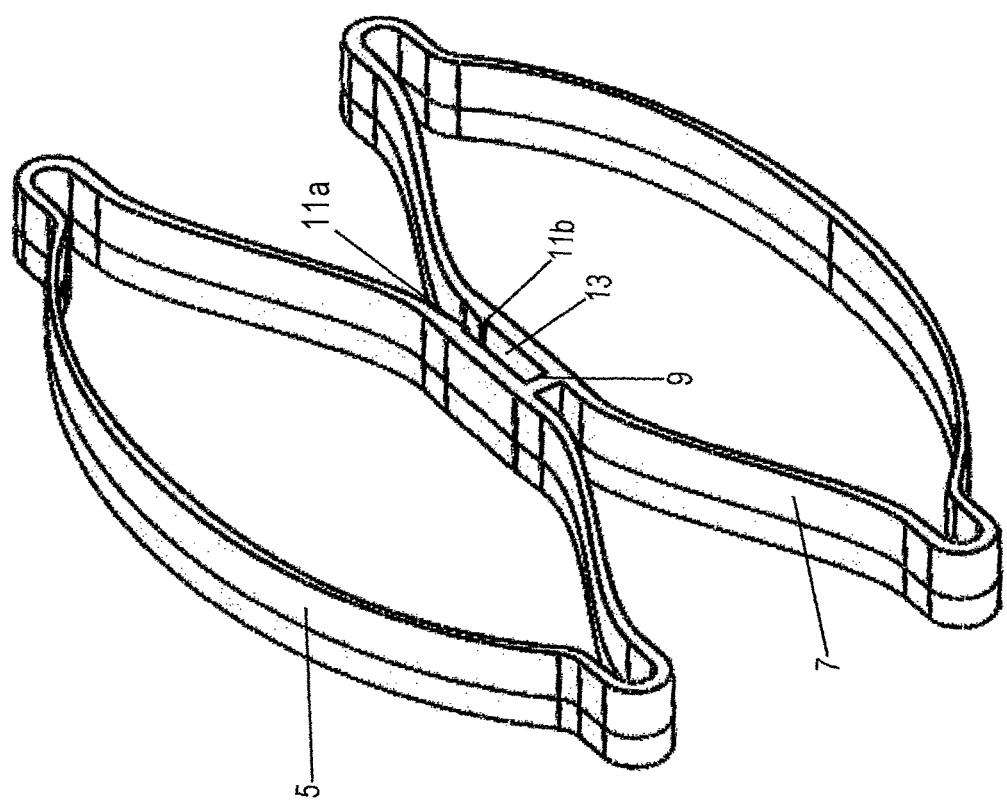

FIG. 1 shows an example of a spring element 1 according to the invention. The spring element consists of a pair of sleeves 5, 7 each of which is formed of an annular plastic band in the form of an ellipsis flattened on one side. The flattened sides of the sleeves 5, 7 face each other and are connected to each other at one point by a connecting bar (connecting piece according to the invention) 9. Moreover, on each sleeve 5, 7, wedge-shaped projections 11a, 11b directed towards the other sleeve 7, 5, respectively, are provided in the flattened area. Said wedge-shaped projections 11a, 11b define a receiving space 13 together with the connecting bar 9 and the flattened area of the sleeves 5, 7 disposed in between.

Figure 2:
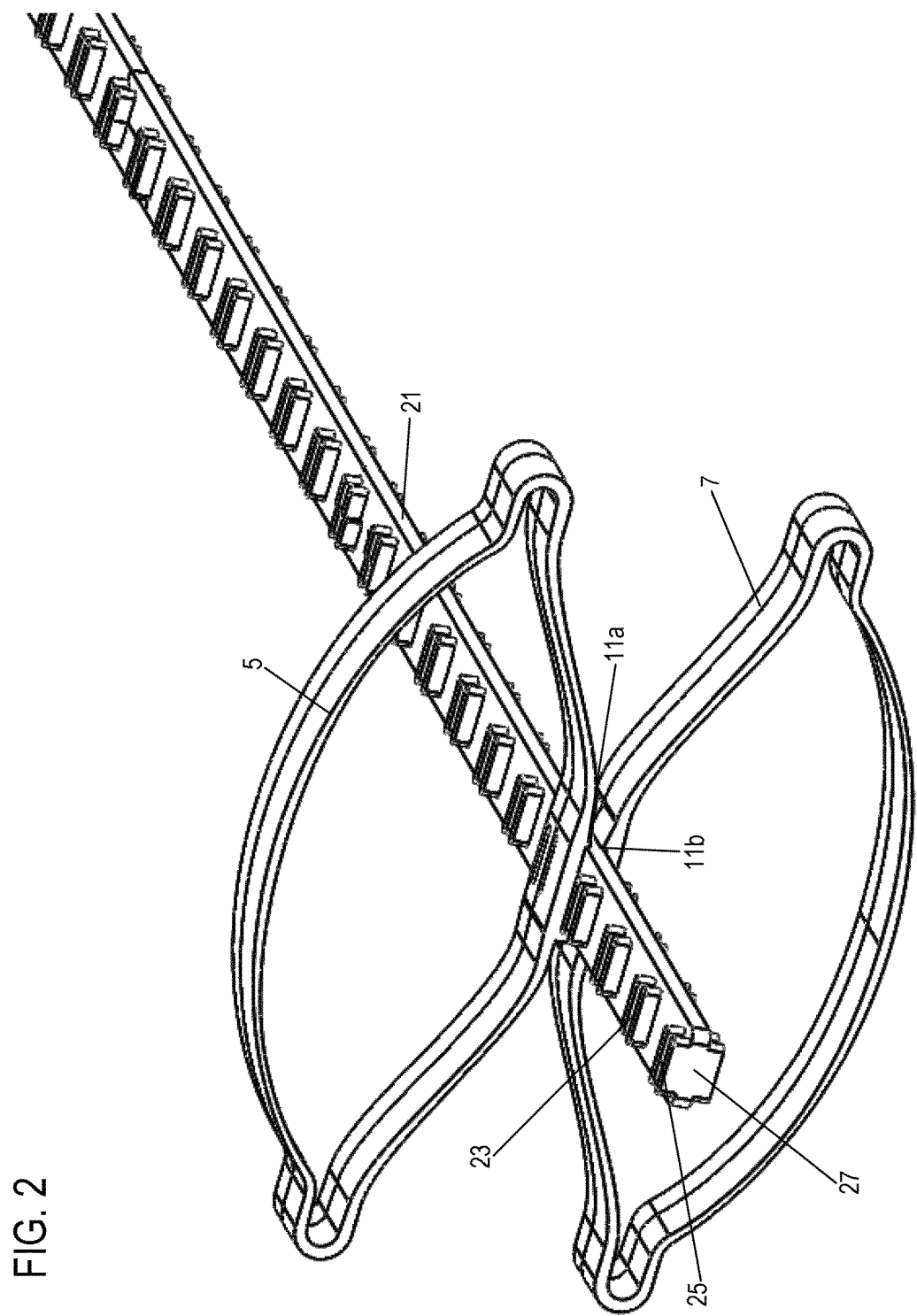
FIG. 2 shows a spring according to the invention, having a spring element fixed to a central bar.

As may be seen from the example of FIG. 2, the receiving space 13 is used to receive a rod-shaped central bar 21. To this end, the spring element 1 is slid onto the central bar 21 such that the latter is introduced into the area between the wedge-shaped projections 11a, 11b. Due to the inclined wedge surfaces, the projections 11a, 11b are forced apart such that the central bar 21 can be received into the receiving space 13 by means of form fit.

By pressing the two sleeves 5, 7 together at a point facing away from the receiving space 13, the two projections 11a, 11b can again be moved apart from each other to such an extent that it is possible to remove the central bar 21 once again from the receiving space 13. Preferably, this takes place by detaching the spring element 1 from the central bar.

These above-described procedures can be carried out in a manner gentle to the material, i.e. there is no weakening of the material that might lead to a failure.

Figure 3:
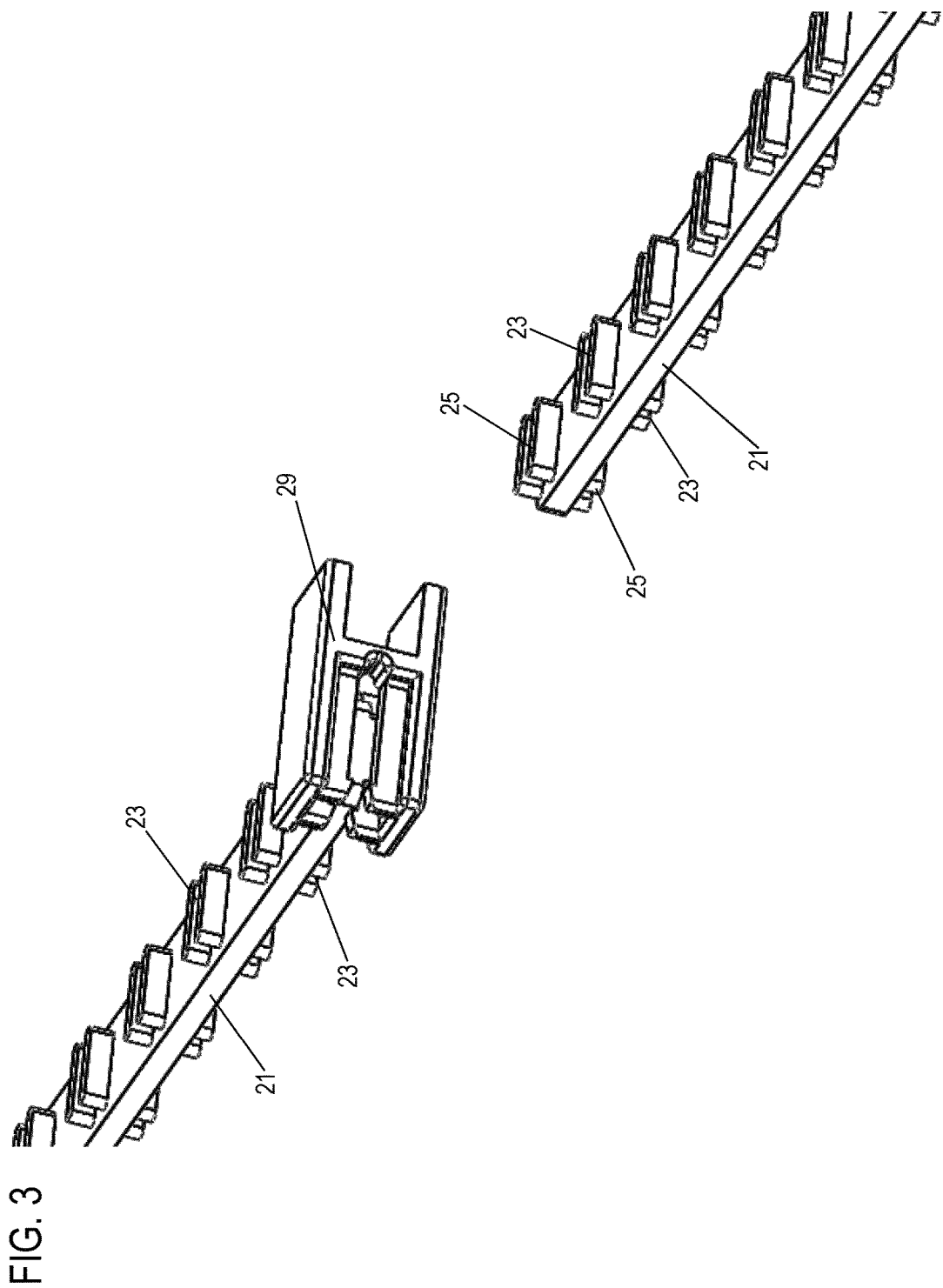
FIG. 3 shows a connection of two central bars by a connecting member.

As may also be seen from e.g. FIG. 2 or 3, the central bar 21 comprises rung-like projections 23 that are arranged in pairs on both sides of the central bar 21. Dimensions of the central bar 21, of the rung-like projections and of the spring element 1 may be gathered from FIG. 8. That is, a distance between two adjacent pairs of rung-like projections is "d", which corresponds to a width "b" of the spring element. The distance between the individual rungs of a pair of the rung-like projections 23 is "c", and the thickness of one individual rung is "t". At the ends, the central bar comprises one pair of adjacent rung-like projections 25, respectively, whose dimensions and distances correspond to those of the rung-like projections 23. The outermost rung-like projection 25 is directly on the edge of the central bar 21, so that a planar end surface 27 is created.

Figure 6:
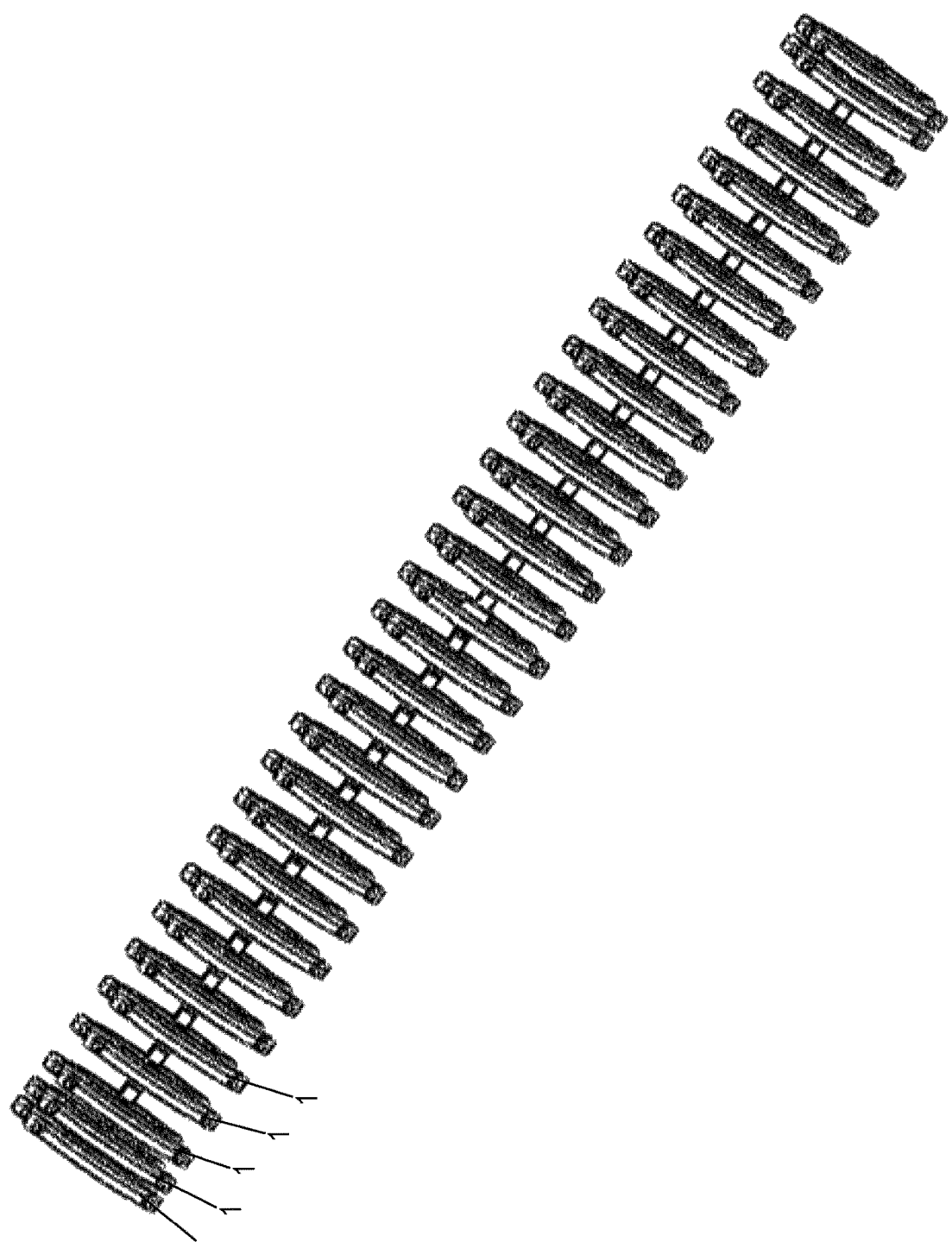
FIG. 6 is a view of an inventive spring according to a second example.

Due to these distance ratios, it is possible to insert one spring element 1, respectively, into the gap between two adjacent pairs of the rung-like projections 23, thereby producing a spring having maximum hardness. It is also possible to arrange directly adjacent spring elements 1 only at the ends of the spring in a peripheral area of the mattress into which the spring is to be inserted, whereas, in a central area of the spring, only every second gap between two adjacent pairs of the rung-like projections 23 is provided with a spring element 1. An example of such a spring is shown in FIG. 6. It shall be pointed out that, for simplicity's sake, not every single spring element 1 has been provided with a reference sign. Likewise, the rung-like projections 23 are not consistently provided with reference signs.

As the above description shows, any arrangements of the spring elements 1 on the central bar 21 are possible. For example, instead of the arrangement shown in FIG. 6 and described above, an arrangement like the one shown in FIG. 7 is possible. According to FIG. 7, the distances between the spring elements 1 from the ends of the spring inwards become larger in three zones. That is, at the ends of the spring, the spring elements 1 are arranged so as to be directly adjacent. In first central areas adjoining the end areas, a gap is left between two adjacent pairs of the rung-like projections 23, respectively, while, in a second central area adjoining the first central area, three gaps have been left between two adjacent pairs of the rung-like projections 23. Due to this, a mattress provided with said spring has a maximally achievable hardness at its edge (periphery), is made to be slightly softer in the area adjoining the edge, and is made to be even softer in its center.

The central bars 21 can basically be produced in any length whatsoever. However, as regards production technology, it has proved advantageous to produce the central bars in a standardized length and to produce special sizes by adjusting these.

If a shorter central bar 21 is required because the mattress has a tapering contour, as is the case with a mattress for a bunk or a caravan, mobile home, etc., it is possible to shorten the central bar 21 simply by cutting off, pinching off, etc.

Figure 4:
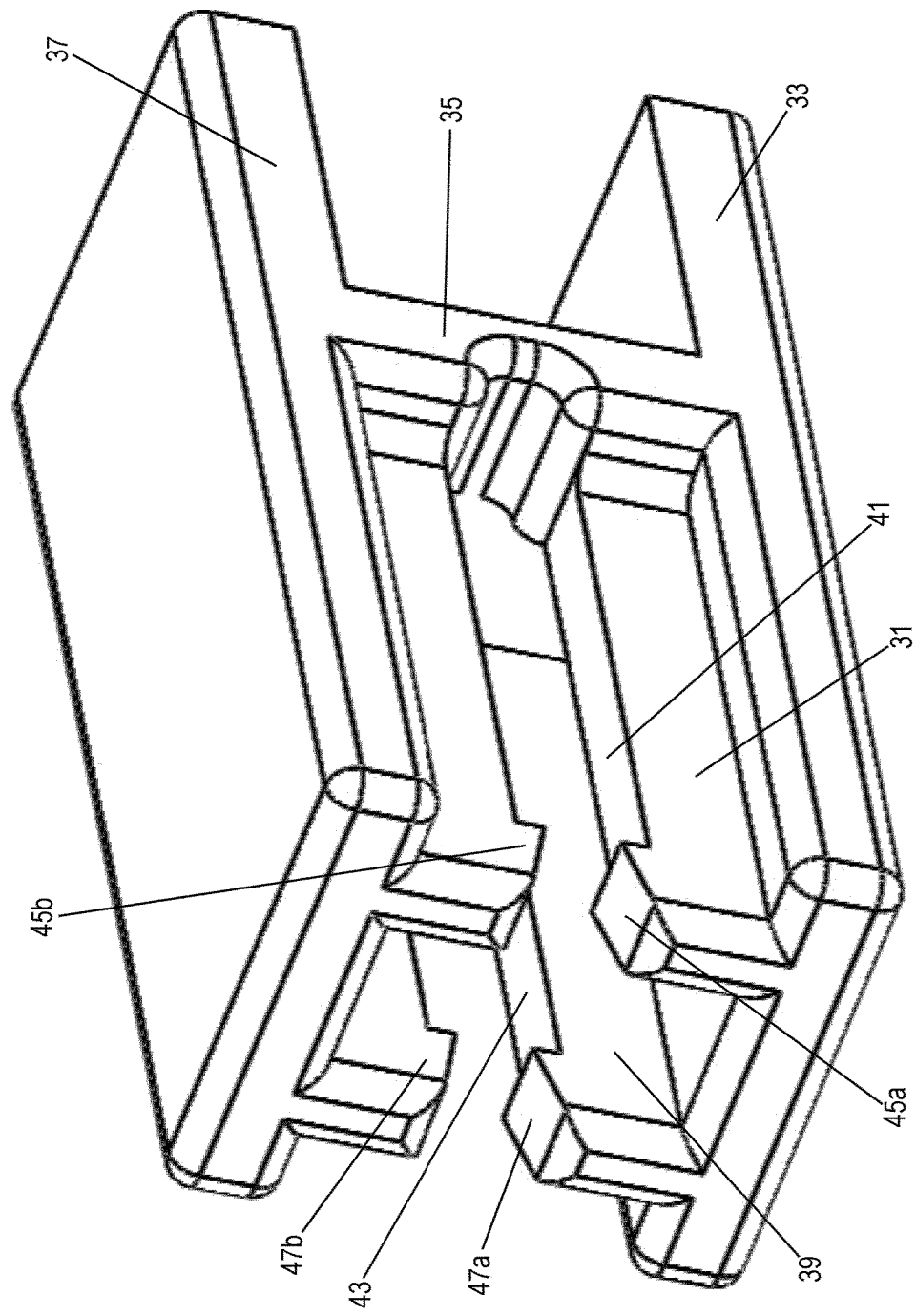
FIG. 4 is a detailed view of a connecting member according to the invention.

However, it is also possible to lengthen the central bar 21. According to the invention, this can be done using a connecting bracket (corresponds to a connecting member according to the invention) 29, which can be seen from FIG. 4. The connecting bracket 9 comprises two jaws 33 and 37, which are connected by a connecting wall 35. Starting out from the connecting wall 35, two walls 31, 39 provided with a slit 41, 43, respectively, are arranged towards one end; these have wedge-shaped projections 45a, 47a, 45b and 47b at their ends facing away from the connecting wall. Thus, each wall 31, 39 defines a space for receiving the central bar 21 by the slits 41, 43 and the projections 45a, 47a, 45b and 47b. As, in addition, the wall thickness of the walls 31, 39 corresponds to the distance "t" between the individual rung-like projections 25, each of the two central bars 21 is fixed so as to be immovable by form fit. The distance (W) between the two walls 31, 39 corresponds to the sum of the width "d" of the gaps and 2× the thickness "t" of an individual rung-like projection (wall distance=2×t). FIG. 3 represents a state in which a connecting bracket 29 is already mounted on a central bar 21 while the second central bar 21 is not yet mounted.

Figure 5:
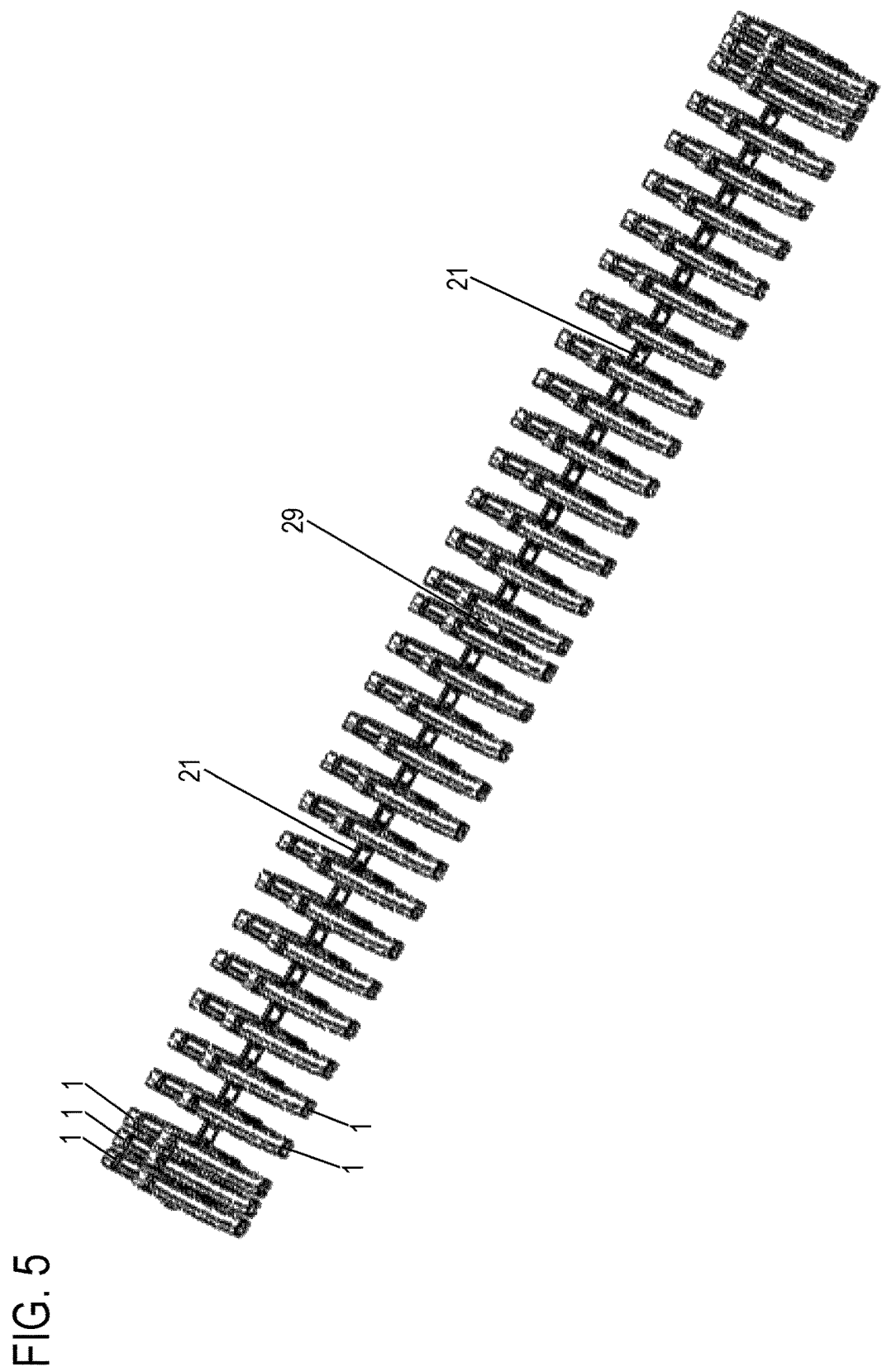
FIG. 5 is a view of an inventive spring according to an example.
Figure 7:
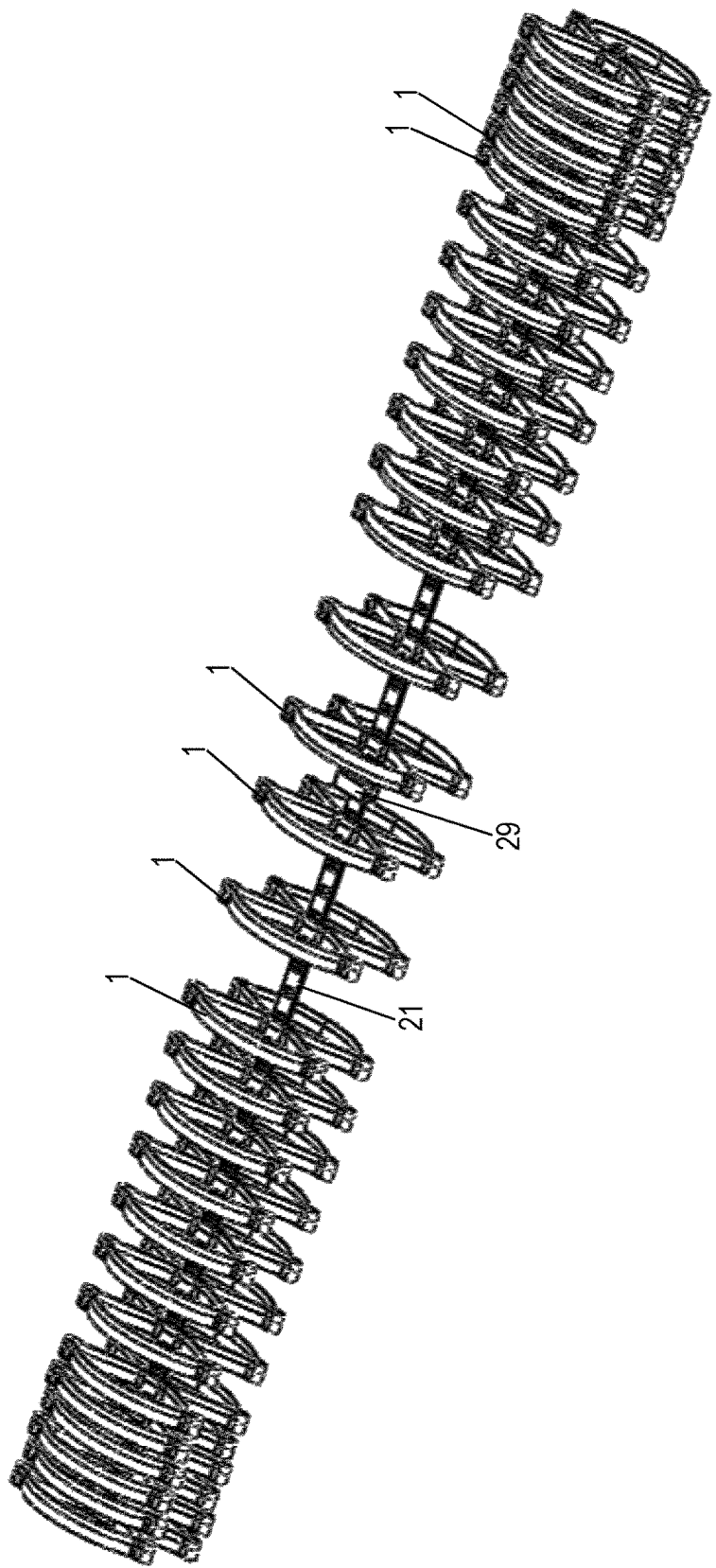
FIG. 7 is a view of an inventive spring according to a third example.
Figure 8:
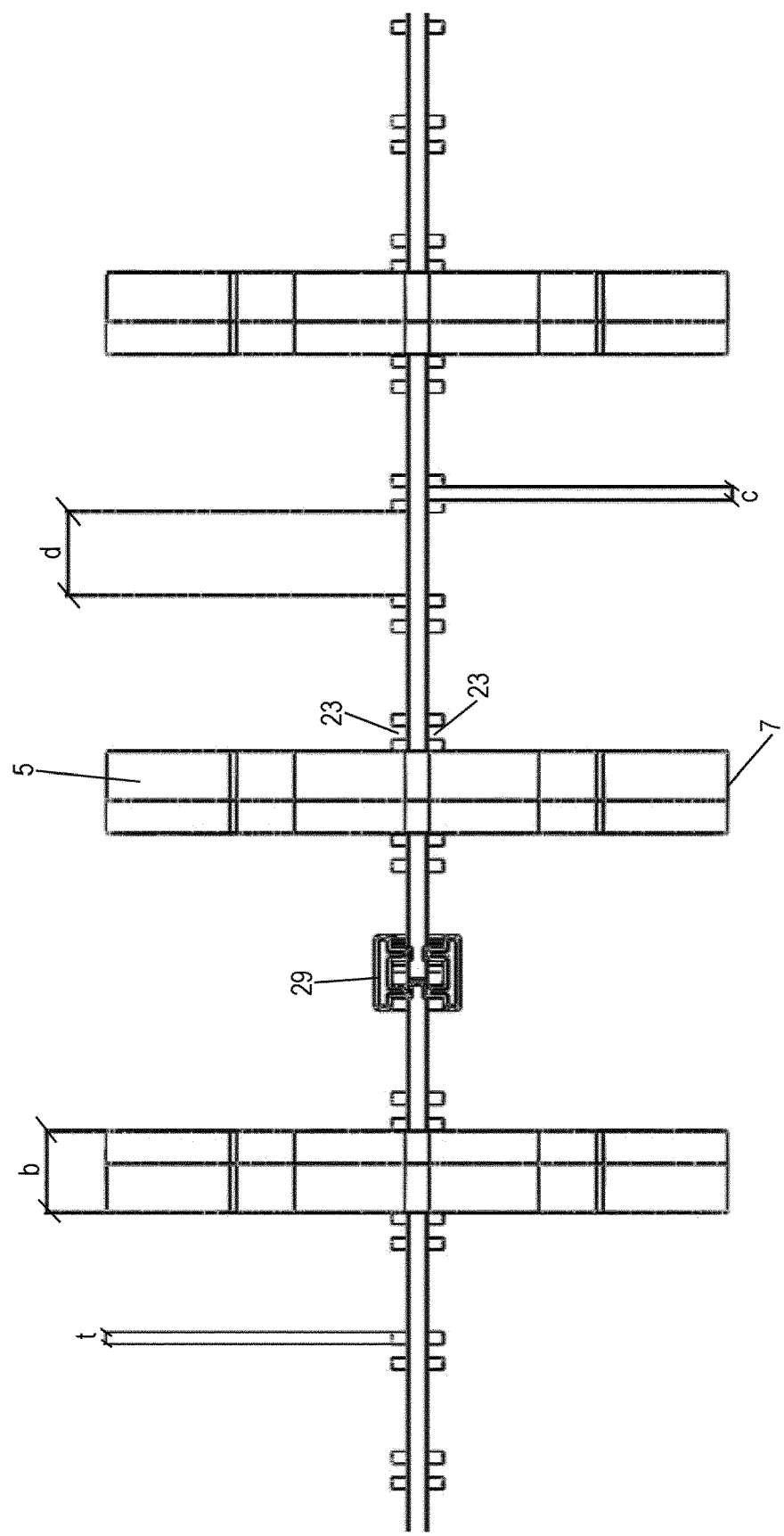
FIG. 8 is a front view of a spring according to the invention.

Thus, it is possible to create connecting webs of any length in an economical way. FIG. 5, FIG. 7 and FIG. 8 show examples of springs having suitably lengthened central bars 21.

A great advantage of the spring according to the invention is the possibility for the user him-/herself to adjust the hardness of the mattress still after delivery. For this purpose, the user only has to remove the mattress cover, pull the spring from the mattress, attach additional spring elements 1, or remove existing spring elements 1, and re-insert the spring into the hollow space of the mattress.

Figure 9:
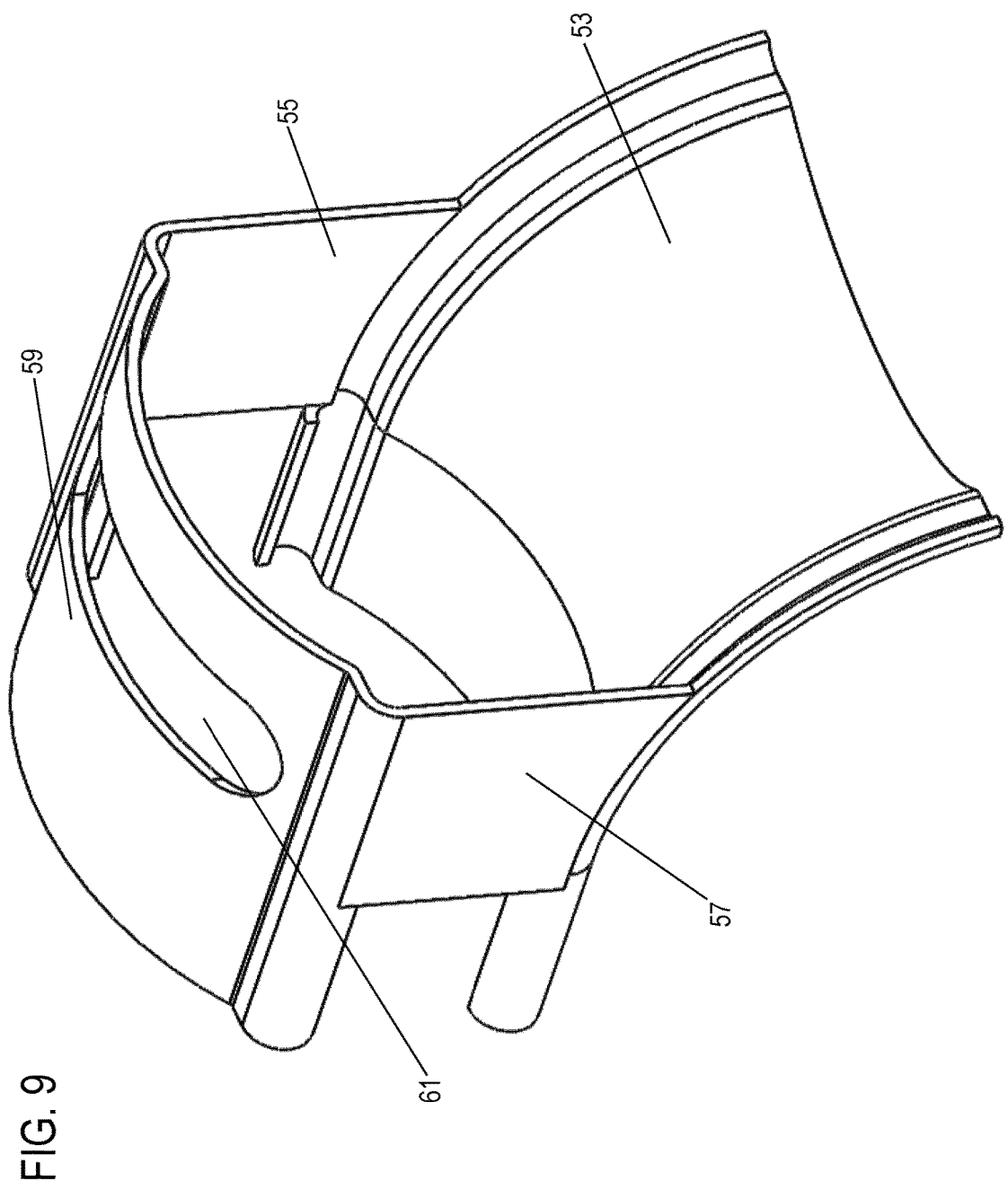
FIG. 9 is a view of a funnel for the inventive insertion of springs into a mattress.

To this end, a funnel 51, which may be seen from FIG. 9, is provided. The funnel comprises an inserting piece 53 in the form of a slide, two walls 55 and 57, and a lid piece 59. Said elements form an opening substantially corresponding to a contour line of the spring. With slight pressure, the spring can easily be put back into the mattress by inserting proximal sections of the lid piece 59 and the inserting piece 51 into the hollow space of the mattress; there do not occur any shifts or creases of the mattress material (foam or latex) which would make an insertion of the spring into the mattress difficult. As soon as the spring has been inserted into the mattress, the funnel 51 can be easily removed from the mattress simply by reaching into a handle opening 61 provided in the lid piece.

Thus, a user may freely adjust the hardness of his/her already existing mattress, e.g. upon a noticeable increase or decrease in weight, without having to buy a new mattress. Likewise, different zones of the mattress, such as the head zone, the shoulder zone, the pelvis zone, etc. can be adjusted to different levels of hardness.

Instead of pressing the spring into the mattress, it is also possible to pull it through the mattress by a tension member to be connected to the central bar 21. The above-described funnel 51 can considerably facilitate this way of mounting the spring, as well.

The invention has been described on the basis of a currently preferred embodiment and various examples. However, the scope of protection shall not be restricted in any way by the description of the embodiments or the representation in the Figures, but shall only be defined by the scope of the attached claims.

LIST OF REFERENCE SIGNS

1 spring element
5 sleeve
7 sleeve
9 connecting bar (connecting piece)
11a, 11b projection (wedge-shaped)
13 receiving space
21 central bar
23 rung-like projections
25 rung-like projections at the ends of the central bar 21
27 end surface
29 connecting bracket (connecting member)
31 wall
35 connecting wall
33 jaw-like member
37 jaw-like member
39 wall
41 slit
43 slit
45a projection
45b projection
47a projection
47b projection
51 funnel

The invention claimed is:

1. A spring element, comprising: a pair of sleeves formed of two oppositely disposed sleeves, wherein each sleeve-of the pair of sleeves is formed of a closed band; wherein the two oppositely disposed sleeves are connected to each other by a connecting piece at one point of their circumferences, respectively; wherein on each sleeve, a projection directed towards the opposite sleeve is provided, spaced apart from the connecting piece, so that a receiving space defined by the connecting piece and the projections is formed between the sleeves; wherein each sleeve has an approximately elliptic cross-section which is flattened in the area of the connecting piece, and wherein each projection is wedge-shaped, which gives the receiving space an approximately rectangular cross-section.

2. A spring, comprising:
a rod-shaped central bar; and
a spring element including
a pair of sleeves formed of two oppositely disposed sleeves, wherein each sleeve of the pair of sleeves is formed of a closed band;
wherein the two oppositely disposed sleeves are connected to each other by a connecting piece at one point of their circumferences, respectively;
wherein on each sleeve, a projection directed towards the opposite sleeve is provided, spaced apart from the connecting piece, so that a receiving space defined by the connecting piece and the projections is formed between the sleeves;
wherein each sleeve has an approximately elliptic cross-section which is flattened in the area of the connecting piece, and
wherein each projection is wedge-shaped, which gives the receiving space an approximately rectangular cross-section;
wherein the spring element is slid onto the central bar such that a portion of the central bar is received in the receiving space of the spring element and is removable without damage from the receiving space of the spring element.

3. The spring according to claim 2, wherein the receiving space can be widened in the area of the projections by compressing the two sleeves at a portion of the spring element facing away from the receiving space, thereby enabling the spring element to be slid onto the central bar or to be detached therefrom.

4. The spring according to claim 2, wherein the rod-shaped central bar has a rectangular cross-section.

5. The spring according to claim 2, wherein the rod-shaped central bar comprises rung-like projections arranged along its longitudinal axis and equally spaced apart from each other, said projections being preferably formed in pairs, and a distance (d) between the rung-like projections corresponds to a width (b) of the band forming the sleeves.

6. The spring according to claim 5, wherein the rung-like projections are formed in pairs, and the distance (d) is provided between adjacent pairs of the rung-like projections, and a pairs clearance (c) is provided between the individual rung-like projections of a pair.

7. The spring according to claim 4, wherein a rung-like projection or a pair of rung-like projections is provided at each end of the rod-shaped central bar such that a stepless end surface is formed on both sides of the rod-shaped central bar.

8. The spring according to claim 7, wherein the rod-shaped central bar is connected at one of its ends to a second rod-shaped central bar by a connecting member.

9. The spring according to claim 8, wherein the connecting member comprises two jaw-like members which, by being compressed at one end, can be widened at the opposite end for receiving and removing the central bars.

10. The spring according to claim 8, wherein the connecting member comprises two opposing walls provided with a slit, between which, in a connected state, the rung-like projections are received at the stepless end surface of the two central bars, wherein one of the rod-shaped central bars is received in one of the slits, respectively.

11. The spring according to claim 10, wherein a thickness of the opposing walls corresponds to the pairs clearance (c) between the individual rungs of the pair of rung-like projections at the end of the rod-shaped central bar and, in the connected state, each wall of the connecting member is disposed between the individual rungs of the pair of rung-like projections.

12. The spring according to claim 10, wherein at least one projection is provided at an open end of each slit for limiting the slit in the shape of the cross-section of the central bar.

13. The spring according to claim 2, wherein several pairs of sleeves are provided, these being slid onto the central bar such that the central bar is received in the receiving spaces of the pairs of sleeves, so that the pairs of sleeves are arranged parallel to each other along the central bar.

14. A mattress comprising:
a mattress body made of a material including foam or latex, having hollow spaces arranged transversely to a longitudinal axis or a lateral axis; and
a spring provided in at least one hollow space, the spring comprising a pair of sleeves formed of two oppositely disposed sleeves, wherein each sleeve of the pair of sleeves is formed of a closed band;

wherein the two oppositely disposed sleeves are connected to each other by a connecting piece at one point of their circumferences, respectively;

wherein on each sleeve, a projection directed towards the opposite sleeve is provided, spaced apart from the connecting piece, so that a receiving space defined by the connecting piece and the projections is formed between the sleeves;

wherein each sleeve has an approximately elliptic cross-section which is flattened in the area of the connecting piece, and wherein each projection is wedge-shaped, which gives the receiving space an approximately rectangular cross-section;

wherein the spring element is slid onto the central bar such that a portion of the central bar is received in the receiving space of the spring element and is removable without damage from the receiving space of the spring element; and wherein the receiving space can be widened in the area of the projections by compressing the two sleeves at a portion of the spring element facing away from the receiving space, thereby enabling the spring element to be slid onto the central bar or to be detached therefrom.

* * * * *